(12) United States Patent
Chen et al.

(10) Patent No.: US 9,047,227 B2
(45) Date of Patent: Jun. 2, 2015

(54) OPERATION CIRCUIT AND METHOD THEREOF

(75) Inventors: Kang-Ying Chen, New Taipei (TW); Yu-Ting Ou, New Taipei (TW)

(73) Assignee: Huafan University, New Taipei (TW)

( * ) Notice: Subject to any disclaimer, the term of this patent is extended or adjusted under 35 U.S.C. 154(b) by 797 days.

(21) Appl. No.: 13/277,284

(22) Filed: Oct. 20, 2011

(65) Prior Publication Data

US 2012/0101781 A1    Apr. 26, 2012

(30) Foreign Application Priority Data

Oct. 20, 2010 (TW) ............................... 99135666 A (51) Int. Cl.
G06F 15/00 (2006.01)
G06F 17/14 (2006.01)
G06F 17/10 (2006.01)
G06K 9/00 (2006.01)

(52) U.S. Cl.
CPC ............. *G06F 17/14* (2013.01); *G06K 9/00536* (2013.01); *G06K 9/00523* (2013.01); *G06F 17/10* (2013.01)

(58) Field of Classification Search
CPC ..... G06F 17/10; G06F 17/14; G06K 9/00523; G06K 9/00536
See application file for complete search history.

(56) References Cited

U.S. PATENT DOCUMENTS

| 6,381,559 | B1 * | 4/2002 | Huang | 702/194 |
|---|---|---|---|---|
| 8,606,836 | B2 * | 12/2013 | Chen et al. | 708/300 |
| 8,660,848 | B1 * | 2/2014 | Humi | 704/270 |
| 2008/0065337 | A1 * | 3/2008 | Huang et al. | 702/66 |
| 2010/0092028 | A1 * | 4/2010 | Huang et al. | 382/100 |
| 2010/0179974 | A1 * | 7/2010 | Pao et al. | 708/207 |
| 2011/0158259 | A1 * | 6/2011 | Chen et al. | 370/482 |
| 2011/0161053 | A1 * | 6/2011 | Wang et al. | 702/189 |
| 2011/0245628 | A1 * | 10/2011 | Baker et al. | 600/301 |

OTHER PUBLICATIONS

Huang et al., "The empirical mode decomposition and the Hilbert spectrum for nonlinear and non-stationary time series analysis" Proc. R. Soc. Lond. A (1998).*
Wu et al., "The Multi-Dimensional Ensemble Empirical Mode Decomposition Method" Advances in Adaptive Data Analysis vol. 1, No. 3 (2009) 339-372.*
Zhang et al., "Performance Enhancement Of Ensemble Empirical Mode Decomposition" Mechanical Systems and Signal Processing 24 (2010) 2104-2123.*

* cited by examiner

*Primary Examiner* — Mohamed Charioui
*Assistant Examiner* — John Kuan
(74) *Attorney, Agent, or Firm* — Rosenberg, Klein & Lee (57) ABSTRACT

An operation circuit and an operation method thereof are revealed. The operation circuit includes an extreme value processing unit, a curve processing module, and a component unit. The extreme value processing unit receives and processes a plurality of input data to get maximum values and minimum values. The curve processing module constructs a first matrix and a second matrix according to the maximum and minimum values and then decomposes the first matrix and the second matrix into first submatrices and second submatrices respectively. According to these submatrices, the curve processing module gets at least one mean value function corresponding to the maximum and the minimum values. The computation of a single matrix is reduced by matrix decomposition and operations of the operation circuit. Compared with conventional Gauss matrix manipulations that run by computer systems, the present invention can be applied to simpler circuits by simplifying matrix operation processes.

8 Claims, 6 Drawing Sheets

OPERATION CIRCUIT AND METHOD THEREOF

BACKGROUND OF THE INVENTION

1. Fields of the Invention

The present invention relates to an operation circuit and an operation method thereof, especially to operation circuit and an operation method thereof applied to an Ensemble Empirical Mode Decomposition (EEMD) and reducing computation for matrices within a time unit.

2. Descriptions of Related Art

Refer to U.S. Pat. No. 5,983,162 "Computer implemented empirical mode decomposition method, apparatus and article of manufacture", U.S. Pat. No. 6,311,130 "Computer implemented empirical mode decomposition method, apparatus, and article of manufacture for two-dimensional signals", U.S. Pat. No. 6,381,559 "Empirical mode decomposition apparatus, method and article of manufacture for analyzing biological signals and performing curve fitting", U.S. Pat. No. 6,738,734 "Empirical mode decomposition apparatus, method and article of manufacture for analyzing biological signals and performing curve fitting" of National Aeronautics and Space Administration (NASA), and US Pub. App. No. 2008/0065337 "Noise-Assisted Data Analysis Method, System and Program Product Therefore", the Hilbert-Huang transform (HHT) is the result of the empirical mode decomposition (EMD) and the Hilbert spectral analysis (HSA) and the HHT provides a new time-frequency analytic method to get frequency variation with time.

As early as in 1940s, Gabor used Hilbert transform has been used broadly in signal processing field. Yet while being applied to define the instantaneous frequency of a signal, the Hilbert transform has many shortcomings (Bedrosian 1963, Nuttall 1966). The most serious one is that the derived instantaneous frequency of a signal would lose its physical meaning when the signal is not a mono-component or AM/FM separable oscillatory function (Huang et al. 1998). Thus Dr. Huang proposed Hilbert Huang transform that combines EMD with Hilbert transform to overcome the shortcoming. After being improved, the EMD method has become a powerful tool in signal processing and data analysis and has been applied to various research including climate cycle, earthquake engineering, engineering geophysical exploration, submarine design, damage detection in structures, satellite data analysis, blood pressure changes, cardiac arrhythmias, etc.

Different from all previous decomposition methods, the empirical mode decomposition (EMD) method is experiential, instinctive, Direct, and adaptive, without preset basis functions. The decomposition way can obtain various simple intrinsic modes of oscillation signals according to each data within local time scale. A simple oscillatory mode called intrinsic mode function (IMF) satisfies the following conditions. (a) In the whole data set, there are the same number (or at most differing by one) of extrema and zero crossings. (b) At any time point, the mean value of the upper envelop defined by the local maxima and the envelope defined by the local minima is zero. In short word, the EMD is an adaptive method that decompose data x(t) in terms of IMFs $c_j$ and a residual component m. That means in the equation, the residual component m could be a constant, a monotonic function, or a function containing only a single extrema, from which no more IMF can be extracted. Therefore, the decomposition method is adaptive and highly efficient. As the composition method is based on the local characteristics of the data, it is applicable to nonlinear and nonstationary processes.

However, no matter how much improvements have been made in EEMD, its operations are required to be run in the computer system. While being applied to various fields, the operations of EEMD still require the computer system. This causes inconvenience to users.

Thus there is a need to provide an operation circuit applied to EEMD that reduces computation for matrices within a time unit by simplification of matrix operations.

SUMMARY OF THE INVENTION

Therefore it is a primary object of the present invention to provide an operation circuit and an operation method thereof that decompose matrices for reducing computation.

It is another object of the present invention to provide an operation circuit and an operation method thereof. The operation circuit is integrated into an integrated circuit so that an Empirical Mode Decomposition device of the operation circuit can be applied to operations in various fields for increasing operation efficiency.

An operation circuit according to the present invention includes a normalization unit, an extreme value processing unit, a curve processing module, a component unit, an accumulation unit and a denormalization unit.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1A:
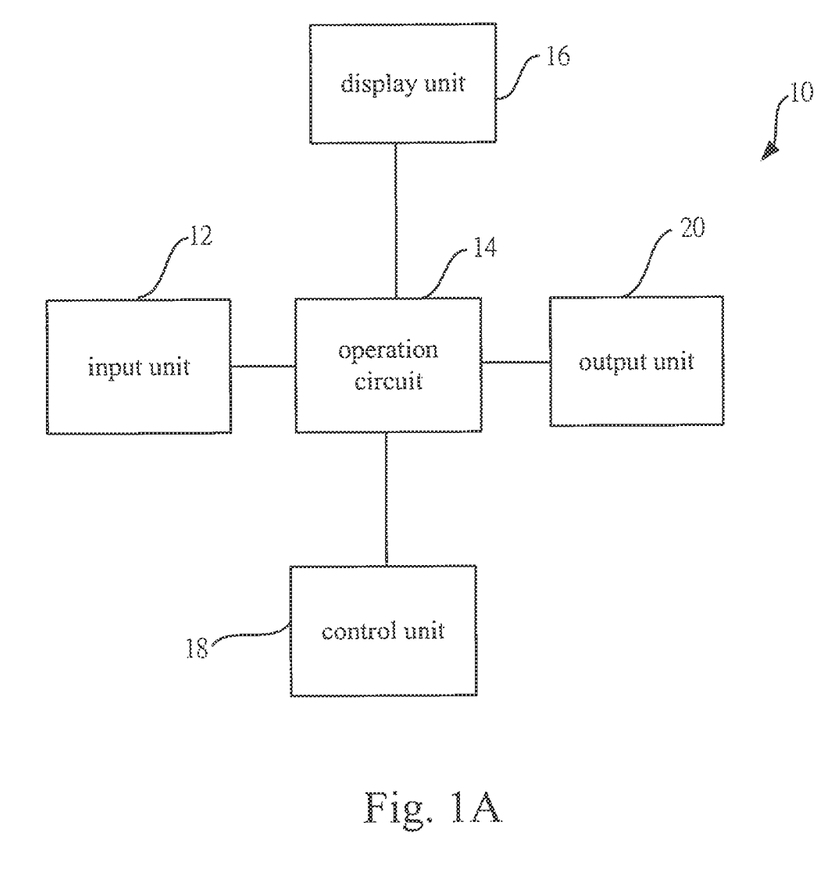
FIG. 1A is a block diagram of an embodiment according to the present invention.
Figure 1B:
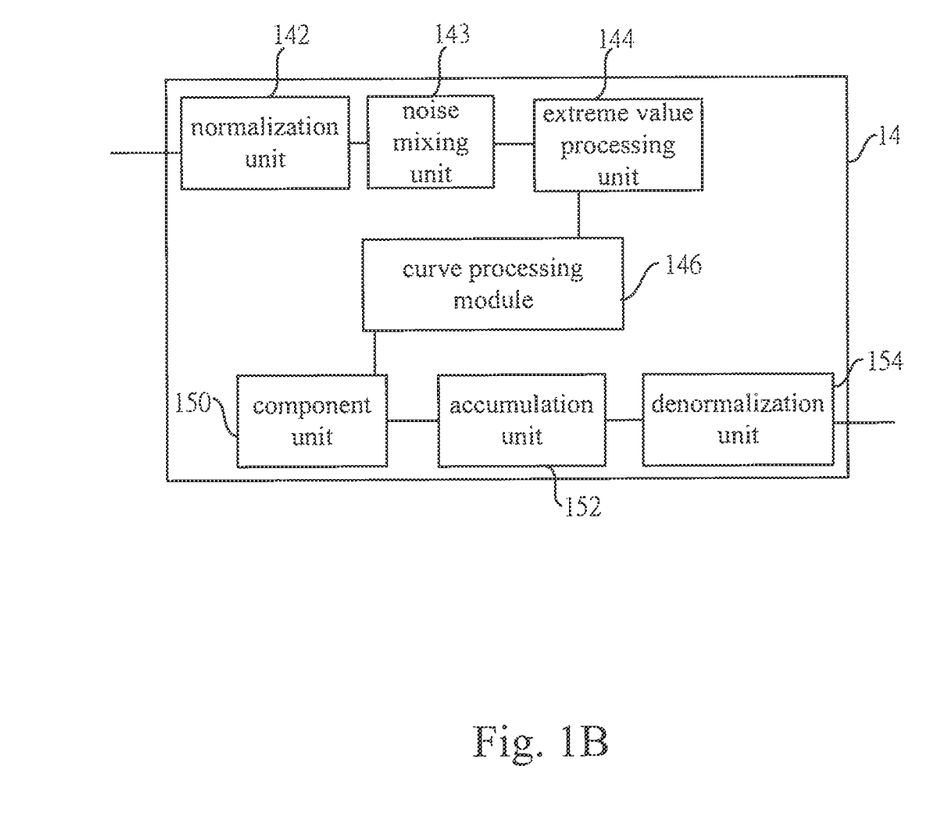
FIG. 1B is a block diagram of an operation circuit of an embodiment according to the present invention.

Refer to FIG. 1A and FIG. 1B, block diagrams of an embodiment of an Ensemble Empirical Mode Decomposition device according to the present invention are revealed.

As shown in figures, a Ensemble Empirical Mode Decomposition device 10 of the present invention includes an input unit 12, an operation circuit 14, a display unit 16, a control unit 18 and an output unit 20. The operation circuit 14 includes a normalization unit 142, an extreme value processing unit 144, a curve processing module 146, a component unit 150, an accumulation unit 152 and a denormalization unit 154. The input unit 12 receives input data and transmits the data to the operation circuit 14. The data input can be one-dimensional data/parameter, two-dimensional data/parameter, three-dimensional data/parameter, or multiple-dimensional data/parameter. The normalization unit 142 removes a standard deviation parameter of the input data and the extreme value processing unit 144 receives at least one input data already being normalized. According to this input data, the extreme value processing unit 144 gets a plurality of maximum values and a plurality of minimum values. According to these maximum values and minimum values, the curve processing module 146 constructs a first matrix and a second matrix. And then the curve processing module 146 decomposes the first matrix and the second matrix into a plurality of first submatrices and a plurality of second submatrices. According to these submatrices, the curve processing module 146 gets a mean value function corresponding to the maximum values and the minimum values. The first matrix is a product of the first submatrices and the second matrix is a product of the second submatrices. The submatrices can be triangular matrices, orthogonal matrices, unit matrices, diagonal matrices or their combinations. In this embodiment, the curve processing module 146 uses an envelope method. According to the maximum values and the minimum values, the curve processing module 146 sets up the first matrix and the second matrix. And then a maxima envelope and a minima envelope are obtained by the first matrix and the second matrix for calculation so as to get a plurality of first interpolation values (corresponding to the maximum values) and a plurality of second interpolation values (corresponding to the minimum values). The maxima envelope is corresponding to both the maximum values and the plurality of first interpolation values while minima envelope is corresponding to both the minimum values and the plurality of second interpolation values. A mean value function is further obtained according to the maximum values, the minimum values, the first interpolation values and the second interpolation values. The component unit 150 gets at least one component according to the mean value function and the input data. The accumulation unit 152 accumulates the components output from the component unit 150 to generate an accumulated component and get an average component according to the accumulated component. The denormalization unit 154 generates an output data by the average component multiplying the standard deviation parameter. Moreover, the operation circuit 14 further includes a noise mixing unit 143 that adds a white noise into the input data in which the standard deviation parameter has already been removed. That means the white noise is mixed into the input data for following processing.

Refer to FIG. 1A, the input unit 12 and the output unit 20 are respectively an input/output port connected to an integrated circuit that support RS232 transmission protocol such as the input/output port connected to 8051 single chip or the input/output port connected to Field Programmable Gate Array (FPGA). The display unit 16 is a liquid crystal display module. The control unit 18 is a keyboard module for control of the operation circuit 14 and display unit 16. Moreover, the normalization unit 142, the extreme value processing unit 144, the curve processing module 146, the component unit 150, the accumulation unit 152 and the denormalization unit 154 are integrated into an integrated circuit.

Figure 2A:
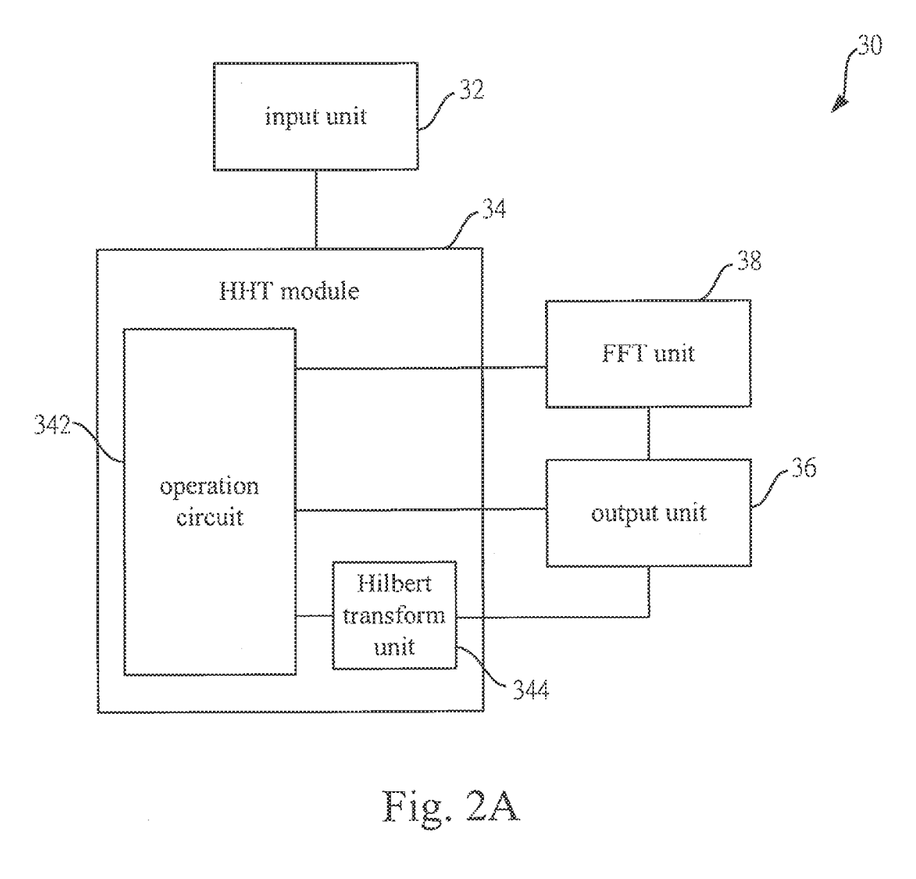
FIG. 2A is a block diagram of another embodiment according to the present invention.
Figure 2B:
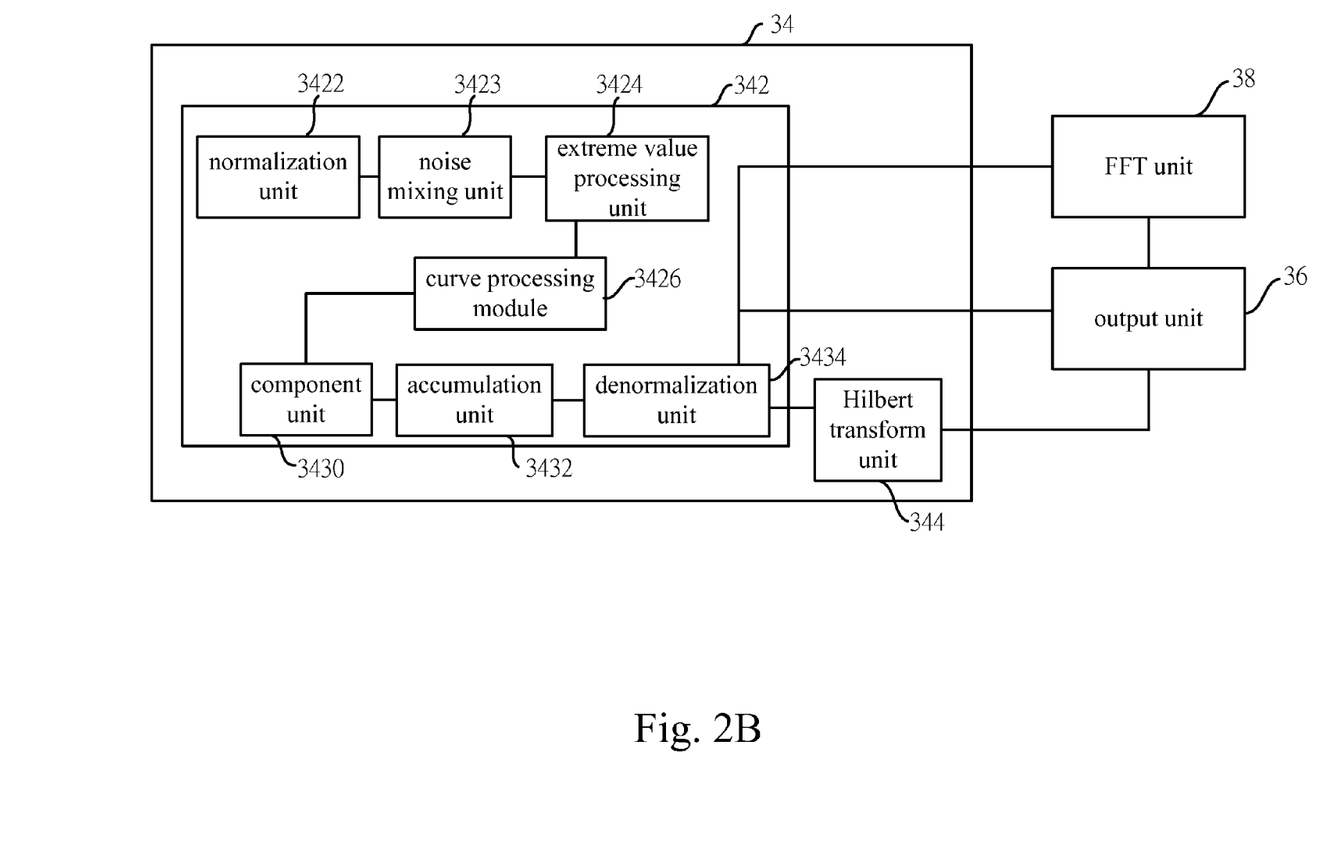
FIG. 2B is a block diagram of an operation circuit of another embodiment according to the present invention.

Refer to FIG. 2A and FIG. 2B, a block diagram of another embodiment is revealed. As shown in the figure, the operation circuit is integrated into an integrated circuit 30 that executes Hilbert-Huang Transform (HHT). The integrated circuit 30 includes an input unit 32, a HHT module 34, and an output unit 36. The HHT module 34 includes an operation circuit 342 and a Hilbert transform unit 344. The operation circuit 342 includes a normalization unit 3422, a noise mixing unit 3423, an extreme value processing unit 3424, a curve processing module 3426, a component unit 3430, an accumulation unit 3432 and a denormalization unit 3434. The connection way of these components is the same with the operation circuit 14 shown in FIG. 1B. Moreover, the integrated circuit 30 further includes a Fast Fourier Transformation (FFT) unit 38. Thus the integrated circuit 30 outputs the output data from the denormalization unit 3434 to the Hilbert transform unit 344, the output unit 36 or the FFT unit 38 according to users' needs so as to get results that matches users' requirements.

Figure 3:
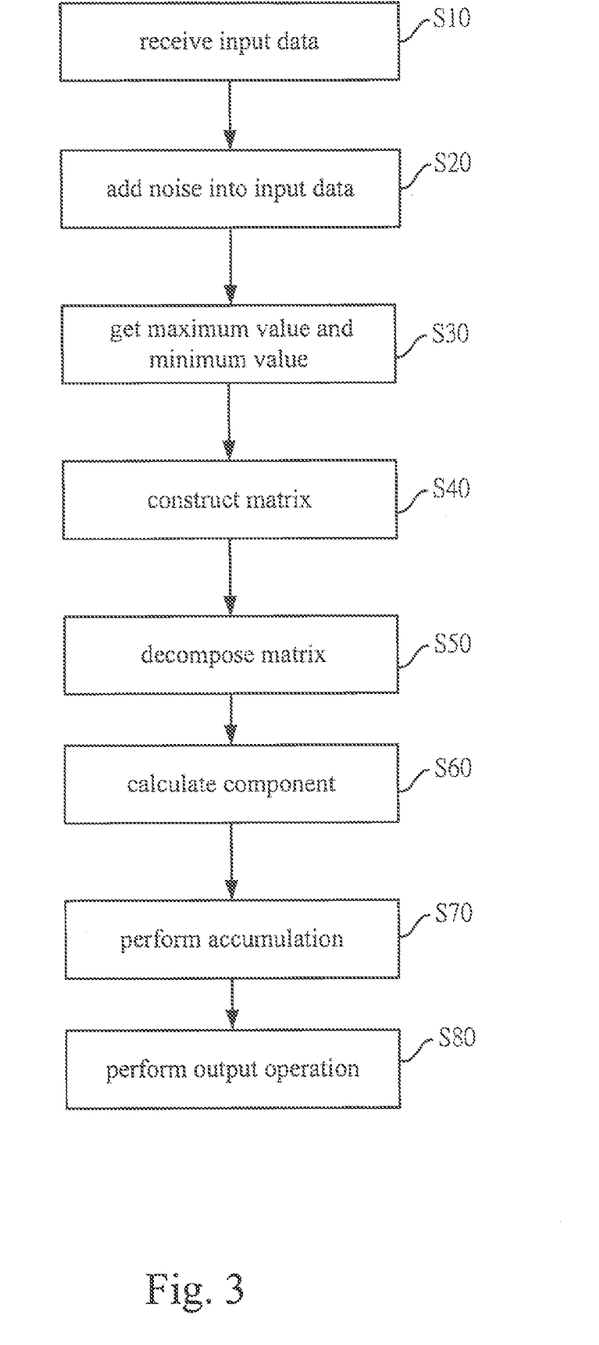
FIG. 3 is a flow chart of an embodiment according to the present invention.

Refer to FIG. 3, a flow chart of an embodiment according to the present invention is revealed. As shown in the figure, an operation method of the present invention is applied to an Ensemble Empirical Mode Decomposition method. The operation method includes following steps.

Step S10: receive an input data;
Step S20: add noise into the input data;
Step S30: get a maximum value and a minimum value;
Step S40: construct a matrix;
Step S50: decompose the matrix;
Step S60: calculate the component;
Step S70: perform accumulation; and
Step S80: perform output operation.

In the step S10, the normalization unit 142 receives at least one input data. In this embodiment, the input data is divided by a standard deviation parameter in the normalization unit 142. For example, the maximum value of the input data is 10000 and the minimum value of the input data is −10000. Thus the input data is divided by 10000 so that the maximum value equals 1 and the minimum value equals −1. The input data can be a one-dimensional data/parameter, 2-dimensional data/parameter, 3-dimensional data/parameter, or multiple-dimensional data/parameter. In the step S20, at least one white noise is added into the input data obtained in the step S10. That means the white noised is added into the normalized input data. In the step S30, according to the input data obtained in the step S20, get a plurality of maximum values and a plurality of minimum values of the input data. In the step S40, construct a first matrix and a second matrix according to the maximum values and the minimum values obtained in the step S30. Refer to the step S50, decompose the first matrix and the second matrix into get a plurality of submatrices that are two of the following matrices, including a triangular matrix, a diagonal matrix, a unit matrix, an orthogonal matrix or their combinations. According to these matrices, get a mean value function corresponding to the maximum values and the minimum values. The multiplication of the submatrices is equal to the matrix. In this embodiment, set up the first matrix by using the maximum values so as to get a maxima envelope and further get a plurality of first interpolation values. Similarly, set up the second matrix by using the minimum values so as to get a minima envelope and further get a plurality of second interpolation values. Thus the curve processing module 146 gets the mean value function according to the maximum values, the minimum values, the first interpolation values and the second interpolation values. In the step S60, get at least one component according to the input data and the mean value function.

In this embodiment, get a first mean value function m1 in the step S50 by an input data X. Then deduct the first mean value function m1 from the input data X to as to get a first difference function h1. Next get a second mean value function m11 according to the first difference function h1. Deduct the second mean value function m11 from the first difference function h1 to get a second difference function h11. And get a third mean value function m13 according to the second difference function h11. Deduct the third mean value function m13 from the second difference function h11 to get a third difference function h13. Later get a fourth mean value function m14 according to the third difference function h13. Deduct the fourth mean value function m14 from the third difference function h13 to get a fourth difference function h14. Similarly, get a fifth mean value function m15 according to the fourth difference function h14 and deduct the fifth mean value function m15 from the fourth difference function h14 to get a fifth difference function h15. Next get a sixth mean value function m16 according to the fifth difference function h15 and deduct the sixth mean value function m16 from the fifth difference function h15 to get a sixth difference function h16. Then get a seventh mean value function m17 according to the sixth difference function h16 and deduct the seventh mean value function m17 from the sixth difference function h16 to get a seventh difference function h17. Get a eighth mean value function m18 according to the seventh difference function h17 and deduct the eighth mean value function m18 from the seventh difference function h17 to get a eighth difference function h18. Get a ninth mean value function m19 according to the eighth difference function h18 and deduct the ninth mean value function m19 from the eighth difference function h18 to get a ninth difference function h19. Next get a tenth mean value function m110 according to the ninth difference function h19. Deduct the tenth mean value function m110 from the ninth difference function h19 so as to get a component C. Thus a component C is obtained according to this step. Refer to the step S70, calculate an accumulated component according to the component obtained in the step S60. Accumulate the component C obtained in the step S60 to get an accumulated component. Refer to the S80, get an average component according to the accumulated component. In this embodiment, only a component is got and the accumulated component is the component C obtained in the step S60.

Figure 4:
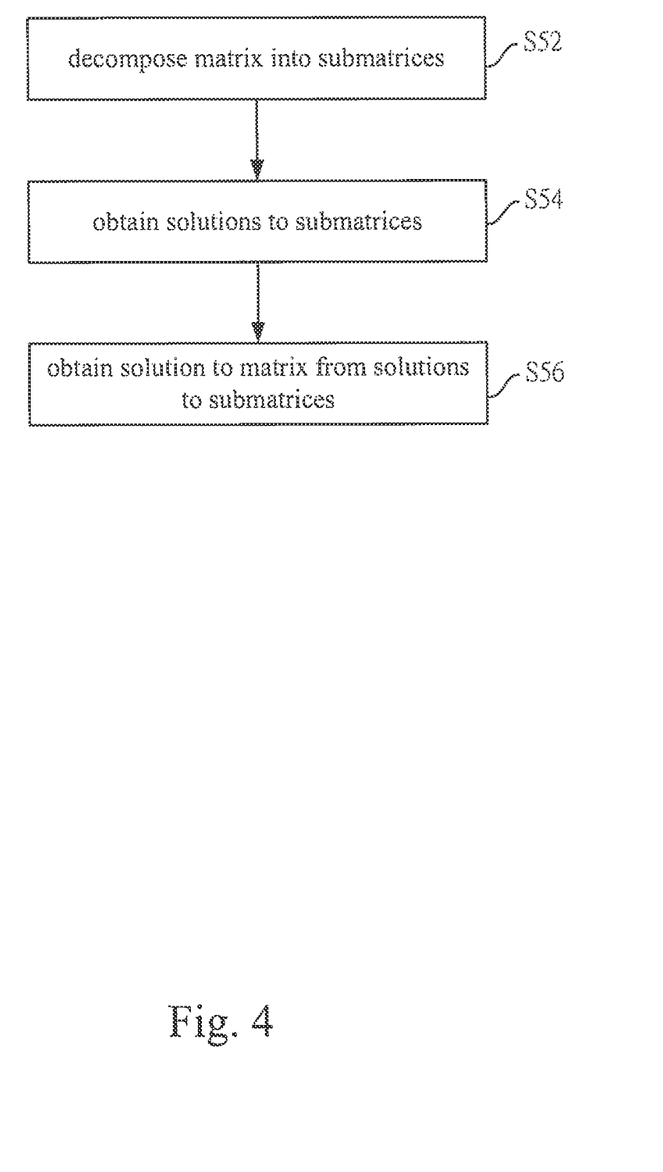
FIG. 4 is a flow chart of an embodiment according to the present invention.

Refer to FIG. 4, a flow chart of the step of decomposing the matrix in FIG. 3 is revealed. As show in figure, the step S50 of decomposing the matrix of the present invention further includes following steps.

Step S52: decompose the matrix into a plurality of submatrices;

Step S54: obtain solutions to the submatrices; and

Step S56: obtain a solution to the matrix, from the solutions to the submatrices;

In the step S52, LU decomposition is used. Decompose the matrix obtained in the step S40 into at least one upper triangular matrix and at least one lower triangular matrix. The matrix in this embodiment is decomposed into an upper triangular matrix and a lower triangular matrix. Thus the upper triangular matrix is corresponding to the maxima envelope and the lower triangular matrix is corresponding to the minima envelope. In the step S54, obtain the solutions to the upper triangular matrix and the lower triangular matrix respectively. Refer to the step S56, obtain a solution to the matrix from the solutions to the upper triangular matrix and the lower triangular matrix. That means to get a mean value function corresponding to the maximum values and the minimum values. Moreover, the present invention can further use QR decomposition by which a matrix got in the step S40 is discomposed into an orthogonal matrix and an upper triangular matrix so as to obtain the mean value function corresponding to the maximum values and the minimum values.

The followings are comparisons between the conventional Ensemble Empirical Mode Decomposition device that uses Gaussian elimination and the Ensemble Empirical Mode Decomposition device of the present invention.

Gaussian Elimination

Find and describe the solution(s) of the following system of linear equations shown in equation 1.

$$2x_1+x_2-x_3+2x_4=5$$

$$4x_1+5x_2-3x_3+6x_4=9$$

$$-2x_1+5x_2-2x_3+6x_4=4$$

$$4x_1+11x_2-4x_3+8x_4=2 \quad \text{Equation 1}$$

The Gaussian elimination algorithm applied to the augmented matrix begins with:

$$[A|b] \begin{bmatrix} 2 & 1 & -1 & 2 \\ 4 & 5 & -3 & 6 \\ -2 & 5 & -2 & 6 \\ 4 & 11 & -4 & 8 \end{bmatrix} \begin{bmatrix} 5 \\ 9 \\ 4 \\ 2 \end{bmatrix} \quad \text{Equation 2}$$

In order to eliminate coefficient of $x_1$ in the equation 1, use following multipliers:

$$m_{2,1}=,2m_{3,1}=-,1m_{4,1}=2 \quad \text{Equation 3}$$

After the operation, the augment matrix becomes:

$$\begin{bmatrix} 2 & 1 & -1 & 2 \\ 0 & 3 & -1 & 2 \\ 0 & 6 & -3 & 8 \\ 0 & 9 & -2 & 4 \end{bmatrix} \begin{bmatrix} 5 \\ -1 \\ 9 \\ -8 \end{bmatrix} \quad \text{Equation 4}$$

In order to eliminate X2 in the $X_2$ equation one, use following multipliers:

$$m_{3,2}=,2m_{4,2}=3 \quad \text{Equation 5}$$

After the operation, the augment matrix becomes:

$$\begin{bmatrix} 2 & 1 & -1 & 2 \\ 0 & 3 & -1 & 2 \\ 0 & 0 & -1 & 4 \\ 0 & 0 & 1 & -2 \end{bmatrix} \begin{bmatrix} 5 \\ -1 \\ 11 \\ -5 \end{bmatrix} \quad \text{Equation 6}$$

At last, eliminate X3 in the equation 1 by following multipliers: $m_{4,3}=-1$ and the augment matrix becomes:

$$\begin{bmatrix} 2 & 1 & -1 & 2 \\ 0 & 3 & -1 & 2 \\ 0 & 0 & -1 & 4 \\ 0 & 0 & 0 & 2 \end{bmatrix} \begin{bmatrix} 5 \\ -1 \\ 11 \\ 6 \end{bmatrix} \quad \text{Equation 7}$$

Or represented by a linear system:

$$2x_1+x_2-x_3+2x_4=5$$

$$3x_2-x_3+2x_4=-1$$

$$-x_3+4x_4x_4=11$$

$$2x_4=6 \quad \text{Equation 8}$$

By back substitution, it can be obtained that:

$$x_4=,3x_3=,1x_2=-,2x_1=1$$

To eliminate elements in the first column, n−1 times of multiplications and subtractions are required. To eliminate elements in the second column, n−2 times of multiplications and subtractions are required. To eliminate elements in the third column, n−3 times of multiplications and subtractions are required. Continue the operation. To eliminate elements in the (n−1) column, one time of multiplication and subtraction is required. In order to obtain solutions of all unknown numbers, n times of multiplications and subtractions are required. Thus the operation times range from n−1 to 1 and the last time of operation takes n times of operations. Thus the total operations are as following series: 1+2+3 ... +(n-2)+(n-1)+n.

The LU decomposition:
The following equation 9 is a tridiagonal matrix:

$$A = \begin{bmatrix} b_1 & c_1 & 0 & 0 & \cdots & 0 \\ a_2 & b_2 & c_2 & 0 & & \vdots \\ 0 & a_3 & b_3 & c_3 & & \\ \vdots & & & \ddots & & \\ & & & a_{n-1} & b_{n-1} & c_{n-1} \\ 0 & \cdots & & 0 & a_n & b_n \end{bmatrix} \quad \text{Equation 9}$$

The matrix is useful in obtaining solutions to partial differential equations. For such matrix, there is a more simple way to decompose the matrix A instead of conventional Gaussian elimination.

After decomposition, triangular matrices L and U are as following equations 10 and 11:

$$L = \begin{bmatrix} 1 & 0 & 0 & 0 & \cdots & 0 \\ \alpha_2 & 1 & 0 & 0 & & \vdots \\ 0 & \alpha_3 & 1 & 0 & & \\ \vdots & & & \ddots & & \\ & & & \alpha_{n-1} & 1 & 0 \\ 0 & \cdots & & 0 & \alpha_n & 1 \end{bmatrix} \quad \text{Equation 10}$$

$$U = \begin{bmatrix} \beta_1 & c_1 & 0 & 0 & \cdots & 0 \\ 0 & \beta_2 & c_2 & 0 & & \vdots \\ 0 & 0 & \beta_3 & c_3 & & \\ \vdots & & & \ddots & & \\ & & & 0 & \beta_{n-1} & c_{n-1} \\ 0 & \cdots & & 0 & 0 & \beta_n \end{bmatrix} \quad \text{Equation 11}$$

Multiply L by U and compare with matrix elements of matrix A to get $\{\alpha_2 \beta_1\}$.

$$\beta_1 = b_1 \qquad : \text{row1 of } LU \quad \text{Equation 12}$$
$$\alpha_2 \beta_1 = a_2, \ \alpha_2 c_1 + \beta_2 = b_2 \qquad : \text{row2 of } LU$$
$$\vdots \qquad : \text{of } LU$$
$$\alpha_n \beta_{n-1} = a_n, \ \alpha_n c_{n-1} + \beta_n = b_n \qquad : \text{row n of } LU$$

According to the above equations, α and β are obtained.

$$\beta_1 = b_1 \quad \text{Equation 13}$$
$$\alpha_j = \frac{a_j}{\beta_{j-1}}, \ \beta_j = b_j - \alpha_j c_{j-1}, \ j = 2, \ldots, n$$

Obtain a solution of a linear system:
$$Ax = f \text{ or } LUx = f \quad \text{Equation 14}$$

Obtain a solution to Lg=f $$g_1 = f_1$$
$$g_j = f_j - \alpha_j g_{j-1}, j = 2, \ldots, n \quad \text{Equation 15}$$

Obtain a solution to Ux=g $$x_n = \frac{g_n}{\beta_n} \quad \text{Equation 16}$$
$$x_j = \frac{g_j - c_j x_{j+1}}{\beta_j}, \ j = n-1, \ldots, 1$$

Thus obtaining a solution of tridiagnoal systems of linear equations only takes three loops. The number of operations of such way is as following:

decomposition $$A = LU$$

additions: n−1
multiplications: n−1
divisions: n−1 obtain solutions $$Lg = f \ Ux = g$$

additions: 2n−2
multiplications: 2n−2
divisions: n

The curve processing module 146 needs to take 3n times of operation to decompose matrix A while performing matrix operation. Then 5n times of operations are taken to get the final solution. The total of 8n operation times takes less time of operation compared with operation times of an arithmetic progression from 1 to n operated by Gaussian elimination. Thus the present invention reduces the operation time, suitable to be applied to an operation circuit on the integrated circuit.

Moreover, the operation circuit of the present invention mounted on integrated circuit has advantages of higher speed and memory reduction.

1. Speed Analysis

Conventional Gaussian elimination takes (1+2+3 ... +n) times of operations while LU decomposition takes 8n times of operations. When the matrix whose size is smaller than 7×7 is operated, the Gaussian elimination is faster while the operation speeds of both methods are similar when the matrix size is 7×7. Once the matrix size is larger than 7×7, the LU decomposition method has an advantage of higher speed. For signal analysis and processing, at least 1024 points are used as a starting. The total operation times for Gaussian elimination are 524800, adding from 1, 2, 3 ... to 1024. As to LU decomposition, the operation times are 8×1024=8192.

For comparison, Table 1 lists operation times of Gaussian elimination and LU decomposition.

TABLE 1

| | Gaussian elimination | | | LU decomposition | | |
|---|---|---|---|---|---|---|
| matrix size | multiplications | additions | total | multiplications | additions | total |
| 5 × 5 | 15 times | 15 times | 30 times | 25 times | 15 times | 40 times |
| 7 × 7 | 28 times | 28 times | 56 times | 35 times | 21 times | 56 times |
| 15 × 15 | 120 times | 120 times | 240 times | 75 times | 45 times | 120 times |
| 1024 × 1024 | 524800 times | 524800 times | 1049600 times | 5120 times | 3072 times | 8192 times |

2. Memory Usage Analysis

It is assumed that Gaussian elimination for the 10×10 matrix requires 100 memory space. As to LU decomposition, it only requires three arrays whose length is 10. In signal analysis for 1024 points, conventional Gaussian elimination requires 1024×1024 memory space while LU decomposition only uses 3×1024 memory space.

For comparison, Table 2 lists memory space

TABLE TWO

| Matrix size | Gaussian elimination | LU decomposition |
| --- | --- | --- |
| 5 × 5 | 25 memory space | 15 memory space |
| 10 × 10 | 100 memory space | 30 memory space |
| 15 × 15 | 225 memory space | 45 memory space |
| 20 × 20 | 400 memory space | 60 memory space |
| 100 × 100 | 10000 memory space | 600 memory space |
| 500 × 500 | 250000 memory space | 1500 memory space |
| 1024 × 1024 | 1048576 memory space | 3072 memory space |

In basic signal analysis, the number of operation times of LU decomposition is 128 times faster than that of Gaussian elimination and the memory space is 341 times less. Both algorithms solve a 1024×1024 matrix within 1 second. While the matrix is as large as 10 k×10 k, LU decomposition can still solve the matrix within 1 second while Gaussian elimination takes about 2.3 seconds. The more data to be analyzed, the faster the operation speed and the more memory saved.

LU decomposition not only reduces time taken to solve the matrix but also saves memory space DSP chip utilized. The memory of the chip is limited so complex method for calculating must be managed. Moreover, in this embodiment, computing chips from TEXAS INSTRUMENTS are used. The operation way of the computing chip is compared with that of a personal computer.

For comparison, Table 3 lists specifications of the personal computer and the DSP.

TABLE 3

| PC specification | DSP specification |
| --- | --- |
| CPU: Intel Mobile Core 2 Duo T7300 | CPU: TEXAS INSTRUMENTS TMS320C6416T |
| Core Speed 2000 MHz | Core Speed 1000 MHz |
| Cache L1: 32K byte × 2 L2: 4096K byte | Cache L1: 32K byte L2: 1024K byte |
| Memory 4096M byte | Memory 16M byte |

In summary, the operation circuit of the present invention that reduces memory used and operations times significantly by simplified algorithm so as to increase operation efficiency of the operation circuit integrated into the integrated circuit. Thus the present invention can be applied to various types of integrated circuit using Empirical Mode Decomposition algorithm. Therefore users can perform analyses on various applications without computers.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An operation circuit, integrated in an integrated circuit for performing an Ensemble Empirical Mode Decomposition operation, comprising:

a normalization unit that receives at least one input data and divides the input data by a standard deviation parameter;

an extreme value processing unit that receives the input data and generates a plurality of maximum values and a plurality of minimum values according to the input data;

a curve processing module that constructs a first matrix and a second matrix according to the maximum values and minimum values, then decomposes the first matrix and the second matrix into a plurality of first submatrices and a plurality of second submatrices respectively, and generates at least one mean value envelope corresponding to the maximum values and the minimum values according to the first submatrices and the second submatrices; the first matrix is a product of the first submatrices and the second matrix is a product of the second submatrices;

a component unit that generates at least one component according to the mean value envelope and the input data;

an accumulation unit that generates an accumulated component according to output results of the component unit and generate an average component according to the accumulated component; and a denormalization unit that generates an output data by the average component multiplying the standard deviation parameter corresponding to the input data.

2. The operation circuit as claimed in claim 1, wherein the operation circuit further includes:

a noise mixing unit that adds a white noise into the input data which is divided by the standard deviation parameter.

3. The operation circuit as claimed in claim 1, wherein the curve processing module constructs a maxima envelope according to the maximum values to generate a plurality of first interpolation values correspondingly; the curve processing module constructs a minima envelope according to the minimum values to get a plurality of second interpolation values correspondingly; the maxima envelope and the minima envelope are respectively corresponding to the first matrix and the second matrix; the curve processing module generates the mean value envelope according to the maximum values, the minimum values, the first interpolation values and the second interpolation values.

4. The operation circuit as claimed in claim 1, wherein the submatrices are least two triangular matrices, at least two diagonal matrices, at least two unit matrices, at least two orthogonal matrices or their combinations.

5. The operation circuit as claimed in claim 1, wherein the extreme value processing unit, the curve processing module and the component unit are integrated into an integrated circuit.

6. An operation method, applied for an operation circuit integrated in an integrated circuit to perform an Ensemble Empirical Mode Decomposition operation, comprising the steps of:

dividing at least one input data by a standard deviation parameter;

inputting the input data to an extreme value processing unit for operations to generate a plurality of maximum values and a plurality of minimum values of the input data;

constructing a first matrix and a second matrix according to the maximum values and the minimum values;

decomposing the first matrix and the second matrix respectively into a plurality of first submatrices and a plurality of second submatrices and generating a mean value envelope corresponding to the maximum values and the minimum values according to the first submatrices and the second submatrices; the first matrix is a product of the first submatrices and the second matrix is a product of the second submatrices; and obtaining at least one component according to the maximum values, the minimum values, the mean value envelope and the input data;

calculating an accumulated component according to the component; and generating an average component according to the accumulated component; and generating an output data by the average component multiplying the standard deviation parameter corresponding to the input data.

7. The method as claimed in claim 6, wherein the step of generating a mean value envelope corresponding to the maximum values and the minimum values according to the first submatrices and the second submatrices further includes the steps of:

constructing a maxima envelope according to the maximum values to generate a plurality of first interpolation values corresponding to the maximum values;

constructing a minima envelope according to the minimum values to generate a plurality of second interpolation values corresponding to the minimum values while the maxima envelope and the minima envelope are respectively corresponding to the first matrix and the second matrix; and generating the mean value envelope according to the maximum values, the minimum values, the first interpolation values and the second interpolation values.

8. The method as claimed in claim 6, wherein the submatrices are least two triangular matrices, at least two diagonal matrices, at least two unit matrices, at least two orthogonal matrices or their combinations.

* * * * *